(No Model.)
J. E. COLLINS & J. W. CLARK.
HAY KNIFE.
No. 342,185. Patented May 18, 1886.
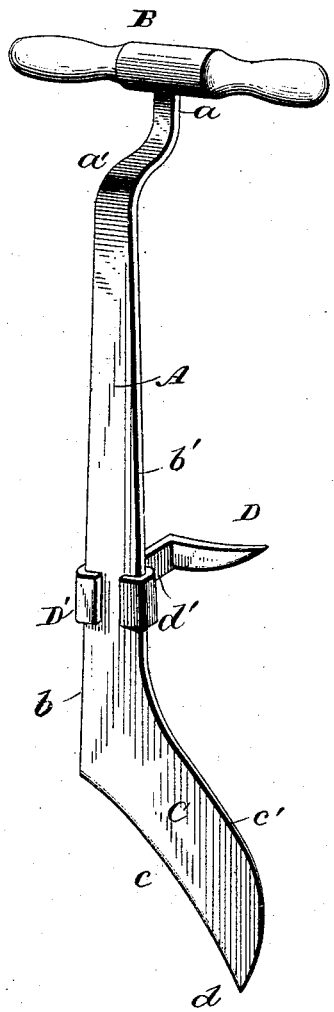
WITNESSES
G. S. Elliott
E. M. Johnson
Joseph E. Collins
John W. Clark
INVENTORS.
Attorney

UNITED STATES PATENT OFFICE.

JOSEPH E. COLLINS AND JOHN W. CLARK, OF OAK CENTER, WISCONSIN.

HAY-KNIFE.

SPECIFICATION forming part of Letters Patent No. 342,185, dated May 18, 1886.

Application filed March 13, 1886. Serial No. 195,146. (No model.)

*To all whom it may concern:*

Be it known that we, JOSEPH E. COLLINS and JOHN W. CLARK, citizens of the United States of America, residing at Oak Center, in the county of Fond du Lac and State of Wisconsin, have invented certain new and useful Improvements in Hay-Knives; and we do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

Our invention relates to certain new and useful improvements in hay-knives, the object of our invention being to provide a knife which will be simple in construction and effective in operation, said knife being made of but a single piece of metal, at one end of which is a blade projecting at an angle of about forty-five degrees from the shank or body portion, said blade being provided with an inwardly-curved cutting-edge and a curved back and point, so that when the point of the blade is forced into the material the curved back will hold the cutting-edge against the material to be severed, as will be hereinafter fully set forth and claimed.

In the accompanying drawing, which illustrates our invention, the figure is a perspective view of a hay-knife constructed in accordance with our improvement, and showing a removable foot-rest attached thereto.

A refers to the shank or body portion of our improved hay-knife, which tapers upwardly toward the handle B, which consists of a crossbar, which is rigidly attached to the upper terminal portion of the shank. Immediately below the handle the shank extends for a slight distance downwardly, as shown at $a$, from whence it is bent outwardly and downwardly, as shown at $a'$, from which point the main portion of the shank extends. The forward portion, $b$, of the shank is substantially at right angles with the handle, while its rear edge or back, $b'$, tapers from the blade upwardly. The upper portion of the shank may be of increased thickness, so as to give greater rigidity to the same.

The blade C, which is formed integral with the shank, has a cutting-edge on its under side, which is curved inwardly from the shank to the point, as shown, said cutting-edge being substantially at an angle of forty-five degrees with the straight edge $b$ of the shank. The blade C is of an increased width, and has a back, $c'$, which is curved, as shown, until it reaches the point $d$.

It will be noticed by the construction hereinbefore described that the handle or grasping portion of the implement is located to one side of the cutting blade or shank, thus providing a convenient means whereby the implement can be reciprocated or forced into the hay or straw without causing the hands of the operator to come in contact with the material, and when the implement is forced into the hay the operator can stand in an upright or natural position, and the cutting-edge being at an angle with the shank, the point curving downwardly, as shown, causes the blade to have a sliding cut in both directions, the form of the back holding the edge in contact with the material to be cut or "up to its work."

D refers to a removable foot-rest, which is provided with a slotted portion, D', which embraces the shank of the hay-knife, and will be bound or clamped tightly thereon as it is forced downwardly. The clamping portion D' of the foot-rest has rigidly attached thereto an outwardly-projecting angular member, $d'$, upon which the foot of the operator will bear when it is desired to use additional force to cause the blade to enter the material to be cut. This foot-rest can be readily removed from the shank by sliding the same upwardly.

We claim—

In a hay-knife, a blade formed integral therewith and provided at its under side with an inwardly-curved cutting-edge, said blade having a curved back and point, the shank A, having its upper end bent to one side for securing a handle thereto, in combination with a removable foot-rest consisting of a slotted portion, D', embracing the shank, and an angular portion, $d'$, rigidly attached thereto, substantially as set forth.

In testimony whereof we affix our signatures in presence of two witnesses.

JOSEPH E. COLLINS.
JOHN W. CLARK.

Witnesses:
ALLEN H. FILBEY,
EDGAR J. CLARK.